April 10, 1928.
L. A. LAURSEN
1,665,311
VULCANIZING METHOD AND APPARATUS FOR RUBBER ARTICLES
Filed Jan. 16, 1925  3 Sheets-Sheet 3
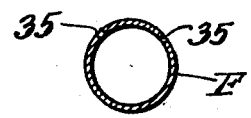
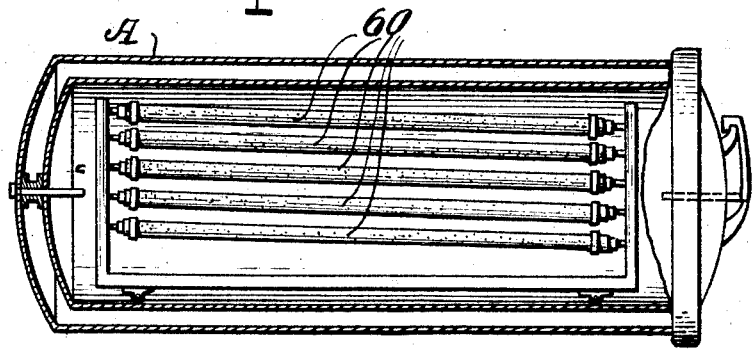
Inventor
L. A. Laursen
Witness:
C. H. Wagner
By
Robb Robb & Hill
Attorneys Patented Apr. 10, 1928.

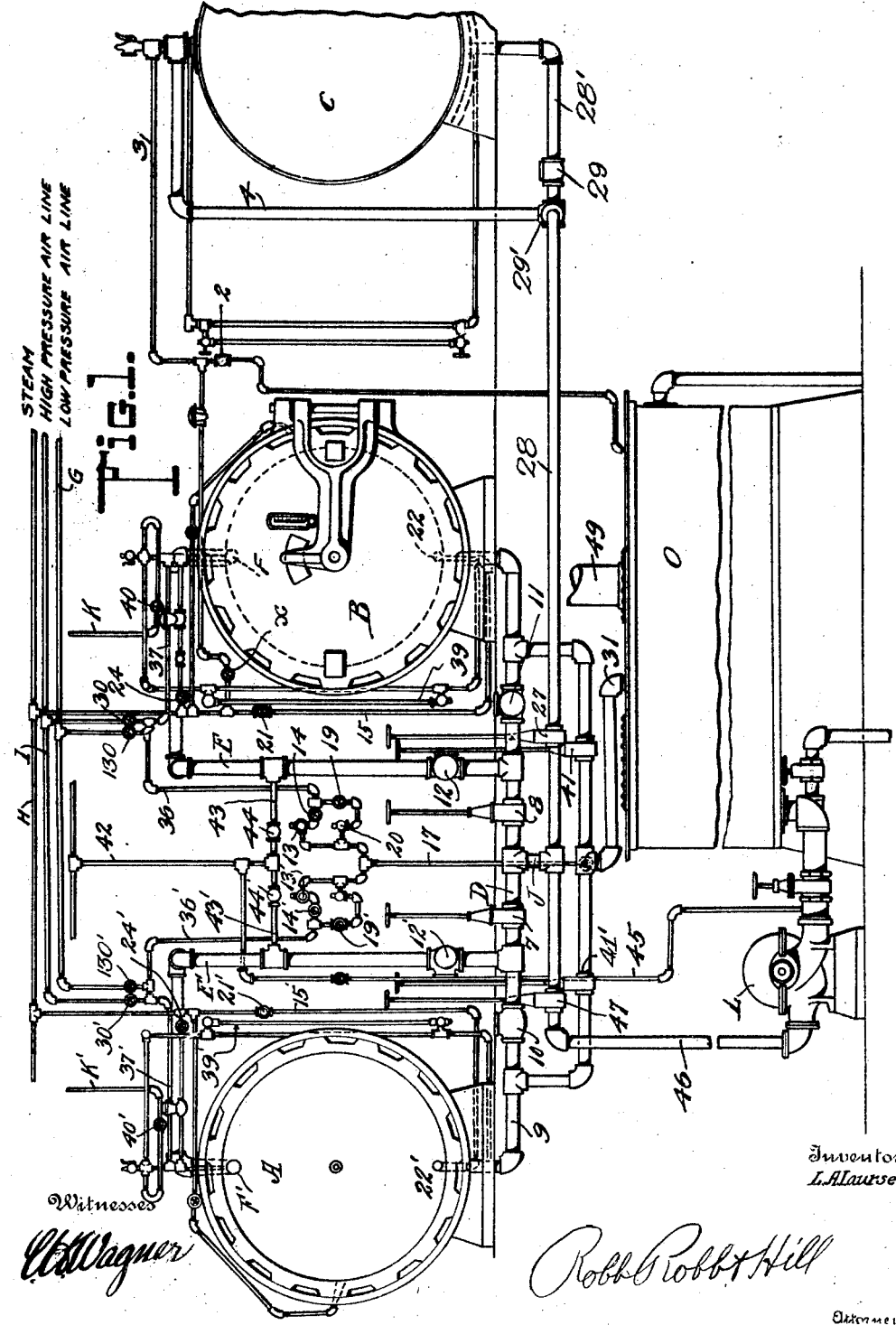

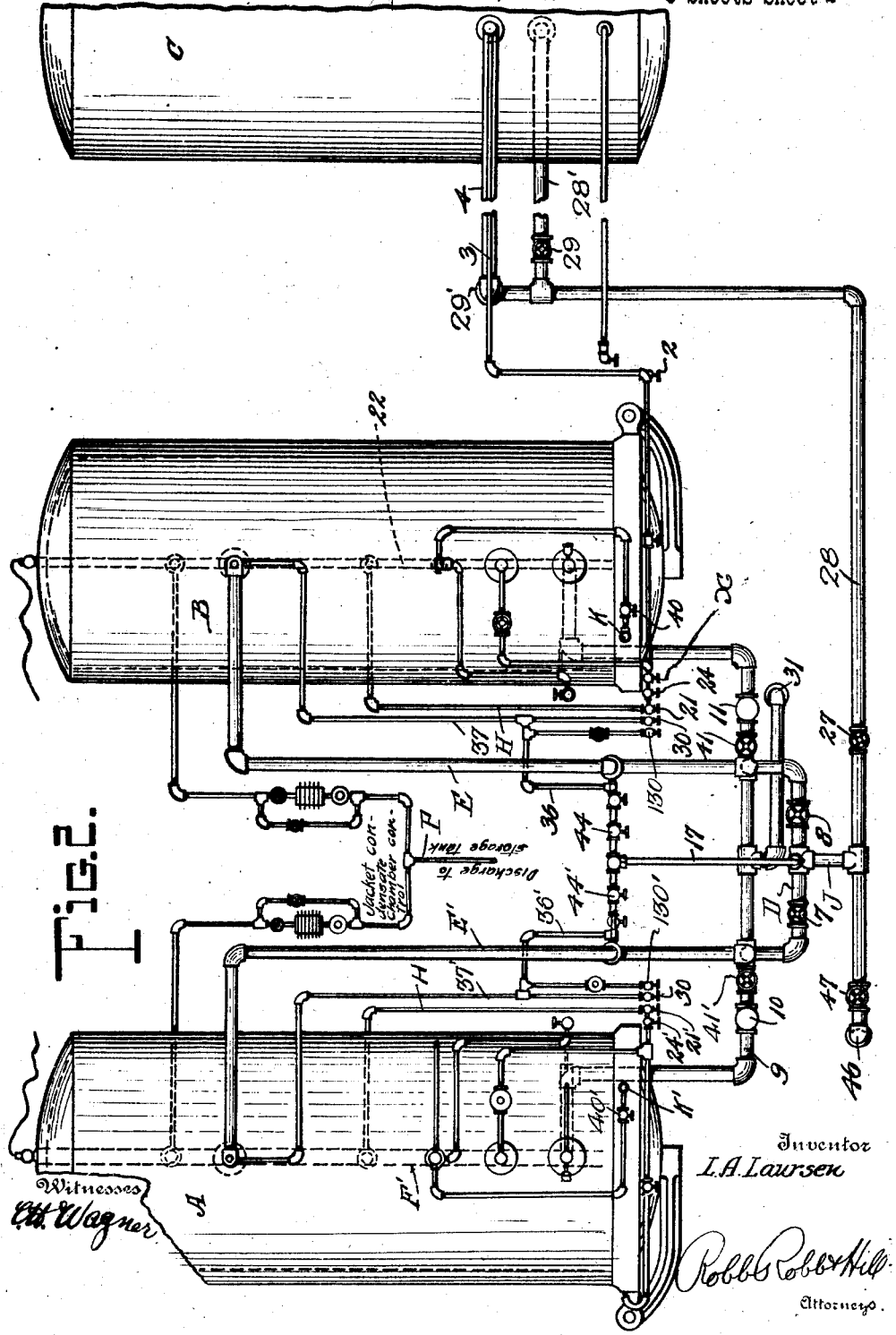

1,665,311

UNITED STATES PATENT OFFICE.

LAURITS A. LAURSEN, OF EAU CLAIRE, WISCONSIN, ASSIGNOR OF ONE-FOURTH TO PEARL FISHER LAURSEN, OF AKRON, OHIO.

VULCANIZING METHOD AND APPARATUS FOR RUBBER ARTICLES.

Application filed January 16, 1925. Serial No. 2,904.

This invention has to do with the art of manufacturing rubber articles, and involves an apparatus and method especially advantageous for the curing or vulcanizing of inner tubes for automobile tires. The invention involves a special installation or system of vulcanizing chambers or heaters peculiarly connected up for conjoint use, with which may or may not be associated storage means for the heating medium employed for the heaters. The system or installation deals primarily with conditions arising in the commercial manufacture of rubber articles of the class referred to, and other classes, and aims to obtain a highly efficient operation of the vulcanizing means, whereby large economies may be effected under practical conditions of use of the system or plant.

In the carrying out of my invention I utilize a battery of vulcanizers, heaters or vulcanizing chambers, which in themselves may be of largely conventional type, and the battery may be composed of two or more such heaters. For the vulcanizing process I utilize the principle of submerging the articles placed in each heater to be vulcanized, in liquid such as water, subjecting the articles when thus submerged to relatively high pressure, whereby to cause the articles to be pressed into close contact with the poles or mandrels, on which they are supported during the vulcanizing operation, and raising the temperature in the heater to the necessary degree for causing the proper curing or vulcanizing action. An installation of heaters according to the system above noted has heretofore been proposed by me, and used. Under practical conditions of use heretofore, I employ the heaters interchangeably, so to speak. When two of them are used, that is to say, I place the rubber articles to be vulcanized in one heater and do the necessary vulcanizing or curing operation in such heater while the other heater is open or inactive for the reason that it is being filled with the rubber articles, getting them ready to be vulcanized. As previously proposed by me, I transfer the fluid contents used in one vulcanizer for curing to the other vulcanizer for subsequent curing in the latter but there has been considerable wastage of heat in so doing which represents, of course, an economic loss which may be figured in dollars and cents for obvious reasons.

I, therefore, wish it to be understood that an important novel feature of my present invention has been to accomplish the objective of transferring the heating fluid or curing medium employed in one heater of a vulcanizer installation, to the other heater, with substantially no loss of heat units from said fluid, or such loss of heat units as is practically negligible.

In accomplishing the above I have devised apparatus and discovered a method by which to maintain the water employed in one heater for the curing operation under the high temperature and temperature pressure condition which has been created in said heater, while the transfer of the water is effected to transfer it for use in the second heater. Or if a storage tank is used and I do not wish to use the water under its high temperature condition in the first heater, I am enabled according to my invention to move the water to the storage receptacle with practically no loss as regards the heat units thereof, and likewise little or no loss as regards the temperature pressure condition. The same action is obtainable in reference to a return of the water from the storage receptacle to either of the heaters.

I utilize in the carrying out of my invention certain automatic controlling connections, valves, and other appliances which while in themselves and individually of known construction, have been peculiarly adapted to the purposes of my vulcanizer installation or plant, to enable their special automatic functions to take place under manual or complete automatic control, and these automatic features of my invention will be especially claimed as novel in the peculiar manner in which they are used in combination with the connections and heaters of the vulcanizing plant.

Referring now to the drawings accompanying this specification, the figures may be briefly described as follows:

Figure 1 is a side elevation of a rubber vulcanizing or curing plant, or system embodying the principal features of my invention.

Figure 2 is a top plan view of the same showing more clearly how the various pipes are connected up with the heaters and storage receptacle.

Figure 3 is a cross sectional view of the steam admission pipe located in the bottom portion of each heater.

Figure 4 is a cross sectional view of the water distributing pipe, one of which is provided at the top of each heater.

Figure 5 is a diagrammatic side view showing inclined poles arranged in a heater according to the invention.

In the drawings I have designated the heaters of the battery shown in the installation illustrated as "A" and "B", but while two heaters are employed it is to be understood that the number may be increased and by the use of proper connections and automatic controls, a larger number of heaters may be employed conjointly, depending upon the desired capacity of the plant. I have designated the storage receptacle associated with the heaters "A" and "B" as "C".

Now with the assumption that the apparatus of my invention has been in use, and the heaters "A" and "B" warmed up incident to their use, if water is admitted to the storage receptacle or tank "C" from either heater, the air in the tank "C" must be permitted to escape. For this purpose the valve 2 is opened and the air passes out from the tank "C" through the pipe 3 as the water enters the tank "C" by means of the pipe 4. When the tank "C" has been filled with water steam will remain therein and the valve 2 may be closed.

The heater "A" may now be charged by placing therein a load of poles or mandrels 60 with the tubes therein (see Fig. 5).

The heaters "A" and "B" may be jacketed heaters, or in other words, they may be surrounded by a heating chamber into which steam or any suitable heating fluid may be introduced in order to raise or maintain the temperature in either heater to the curing point. However, I do not have to use a jacketed heater should there be available a supply of steam under high enough pressure to inject it into the water in either heater in order to maintain a uniform curing temperature of the water during the operation of vulcanizing the same. I show jacketed heaters as a convenient type for carrying out the processes of my invention, however.

The poles and mandrels above referred to, are those such as ordinarily used as formers for making the tubes for automobile casings or tires.

Having installed a load of tubes to be vulcanized in the heater "A", said heater is closed and then filled with water, the temperature of which is raised to approximately 300° F. with a temperature pressure of approximately 50 pounds.

The above temperature and temperature pressure are preferably employed for rubber tubes in vulcanizing but it is to be understood that when I refer to the same herein, I have in mind a suitable temperature and temperature pressure at which curing takes place, the same varying somewhat dependent upon the different kinds of articles which are being handled in the apparatus.

During the operation of vulcanizing the tubes in the heater "A" an installation of such tubes in heater "B" is being made and said heater is being closed so as to be ready for vulcanizing as soon as that operation is completed in the heater "A".

The manner in which the water or curing medium in one heater is transferred to the other heater will now be set forth in detail.

The heated water in the heater "A" is caused to pass to the heater "B" without exposing it to the atmosphere in order to maintain practically all of the heat in the water in the operation of transferring it to the heater "B".

The flow of the water from the heater "A" to the heater "B" is caused by opening the valves 7 and 8 of the charging pipe line "D". Water from the heater "A" will pass from its bottom through the pipe 9, now open check valve 10, through the valve 7, through the valve 8 to the check valve 11, automatically closed thereby, to the valve 12 in the pipe "E" which extends vertically from the pipe "D" adjacent to the heater "B". The water is now passing up through the pipe "E" to the top of the heater "B" and enters said heater "B" at its top by means of the perforated pipe "F", located at the top of heater "B" and constituting a water distributing pipe.

The pipe "F" has rows of openings near its top, designated 35, through which openings the water sprays into the heater "B" in an upward manner, strikes against the vulcanizer and breaks into a spray so as not to injure the raw gum-stock, and falls down over the tubes surrounding the poles or mandrels installed in the heater "B". As the water enters the heater "B" it has a temperature of approximately 300° F., a few degrees of heat having been lost incident to radiation while the water passes through the pipes. When the water strikes the tubes of relatively cool or cold gum-stock on the relatively cool or cold poles or mandrels in the heater "B", said water is cooled considerably and the temperature thereof as well as the incidental temperature pressure will drop.

The heater "B" is now filling with water and as it fills the air which is in the poles or mandrels, and other air in the heater "B" is forced to the top of the heater owing to the rising level of the water therein, and this air must be eliminated.

For the above purpose I provide a poppet valve 13 of a known type which is set to maintain a pressure in the heater "B", slightly higher than the prevailing temperature pressure. In this instance I set the valve to let off pressure at about 45 pounds, and this valve 13 is connected by means of pipes 36 and 37 to the interior of the heater "B". Adjacent to the poppet valve 13 is a manual controlling valve 14, which is opened to permit the air rising to the top of the heater "B" to empty out of the heater through said poppet valve 13, having the 45 pound pressure relief adjustment. In this manner I maintain a pressure of at least 45 pounds in the heater "B".

It will, therefore, be understood according to the example of operation which I am giving that the water entering the heater "B" in the manner stated will lower in temperature approximately 10° F., as compared with its temperature when it left the heater "A". This reduction in temperature varies somewhat from 10° F., which is an approximate figure since the cooling depends very largely upon the size of the load of tubes and poles which are installed in the heater "B" for curing; also, it depends upon the kind of gum-stock of which the tubes are to be made. Assuming the drop in temperature to be about 10° F., however, the pressure in the vulcanizer or heater "B" is automatically built up to about 45 pounds almost instantly. On the other hand, as the water is leaving the heater "A" steam will escape therefrom and maintain a pressure of about 50 pounds in said heater "A".

In the above manner I obtain a pressure differential, which is referred to in such terms for the purposes of this specification, and this differential is sufficient to effect the flow of the water from the heater "A" to the heater "B".

Under commercial conditions, however, it is desirable that the movement of the water in its highly heated condition in the heater "A", to the heater "B", be expedited, primarily for the purpose of increasing the capacity of the apparatus of my invention. For this reason I propose to accelerate the movement of the water to increase its velocity to a much greater extent than is obtainable by the differential of pressures established in the heaters "A" and "B" in the manner above described.

The increased velocity of the water passing from the heater "A" to the pipe 9, pipe "D", and pipes "E" and "F", is produced by admitting compressed air into the heater "A" on top of the water. This compressed air will expand in the heater "A" and sufficient air is introduced to force the water from the heater "A" to the heater "B" at substantially any desired velocity within the limits required by commercial practice. The said compressed air is passed into the heater "A" from a low pressure air line including the pipe "G" connected by the branch pipe 37' with the heater "A" and having a manual controlling valve 130'.

As previously suggested, the water passing to the heater "B" from the heater "A" forces out the air through the valve 13 under manual control by opening valve 14 and said air enters the discharge pipe 17 after it has passed through the poppet valve 13.

Assuming that the heater "B" is now filled with water, the valve 8 is closed, as is also the valve 14 which controls the valve 13. I then open the valve 19, adjacent to the valve 14 and having connection with the pipe 36. As soon as this is done a poppet valve 20, controlled by the valve 19, becomes operative. The said valve 20 is set to relieve pressure at approximately 65 pounds.

Steam is now admitted to the heater "B" by opening a valve 21, located in the length of a pipe 15 which leads into the bottom of the heater "B" from a steam supply line pipe "H" which may be connected with a steam supply of a boiler or power house. Steam is in this manner caused to pass into the heater "B" through a perforated pipe 22, extending horizontally along the bottom of the heater "B" nearly the whole length of the heater, said pipe being perforated at its opposite sides for this purpose as shown in Figure 3.

The steam thus caused to enter the heater "B" performs two functions. In the first place, it causes a circulation of water in the heater to create a uniformity of temperature throughout the area of submergence of the said water. In the second place, this steam is utilized to heat the water back up to the proper curing temperature and pressure which would be for the purpose of this description approximately 300° F. and 50 pounds, respectively. As before explained, the water is maintained at this curing temperature by the steam jacket surrounding the heater, and which is supplied with steam under control of the valve 24.

As soon as the above temperature pressure has been reached the manually operated valve 21 is closed to discontinue the supply of steam. It is noted, however, that while the said steam was entering the water to raise its temperature, it was also condensing into water, and a surplus of water is thus created which must be disposed of. For this purpose the valve 20, before referred to, is utilized which allows any surplus water to escape through the pipe 17 leading into the water tank O, subsequently to be described. Any excess of pressure due to the expansion of the air or water is also taken care of in the same way. This valve 20 being set at approximately 65 pounds relief pressure does not allow the steam in the water to escape. After the water has been heated up to the proper temperature the valve 19 is closed and the valve 30, controlling the air from the high pressure air line I, is opened until a high pressure of approximately 150 pounds is applied to the water in the heater "B".

The purpose of admitting this high pressure air is to place the rubber articles or tubes in the vulcanizer or heater "B" under sufficient pressure to maintain them in close working contact with the poles or mandrels, on which they are disposed. I rely upon this pressure action to enable me to dispense with the present commonly used method of wrapping the tubes with cloths or fabric wrappings, used to prevent air or water from entering between the tubes and the poles and causing bubbles, or defects, or "ballooning", of the tubes in the manner well known to those versed in the art to which my invention appertains. I might say, however, that I of course seal the ends of the tubes on the poles or mandrels before they are placed in the heater or vulcanizer, preferably by means of cured rubber bands or binders surrounding the ends of the tubes and poles (see Fig. 5).

This feature of my process is embodied in a separate application for patent, however, (see my pending application Serial Number 624,977, filed March 14, 1923, and also my pending application Serial Number 740,308, filed September 27, 1924), and does not form in itself a feature of this particular invention save that the manner of application of the tubes and to the poles is utilized in operating the apparatus hereof.

I wish it to be understood that according to my invention the pressure on the articles in the heater "B", of 150 pounds, may be produced by means other than compressed air although the air means is a convenient and commercially flexible method to employ.

Let us assume now that the installation of tubes in the vulcanizer or heater "B" has been subjected to curing temperature until the curing is completed. To empty the heater "B" by causing the water therein to flow back to the heater "A" I open the valve 8 and the valve 7 again. Under these conditions through the provision of duplicate pipes and valve arrangements like those which have thus far been described as associated with the heater "B", the water will pass back to the top of the heater "A" owing to the opening of the check valve 11, the closing of the check valve 10 and the diversion of the water from the pipe "D" up through a pipe E′, the latter leading to the top of the heater "A" and corresponding to the pipe "E", previously mentioned.

Without describing the duplicate pipes or connections for the heater "A" which are quite equivalent to those previously described, I have designated them largely as follows, using the same number as previously used but with the prime designation accompanying said number; 24′, 86′, 20′, 13′, 12′, 19′, 14′, 15′, 21′, E′, 22′, 30′, F′, 37′, 27′, 39′, 40′, and K′.

For economy of piping and to simplify my apparatus as much as possible I connect up the steam supply line H, the high pressure air line "I", the low pressure air line "G" and certain other of the pipes employed for conducting air, steam or water, with both sets of the pipes and valves referred to above of duplicate construction.

I now describe how the water in either one of the heaters may be caused to enter the storage receptacle or tank "C", which has been referred to heretofore and which may be considered another heater used for the sole purpose of storing water under temperature pressure, in order to conserve the heat units in the water, such conservation, of course, representing a saving of power, fuel, or equivalent economies in commercial practice. To cause the water to enter the receptacle "C" from the heater "B" I open the valves 8 and 27. The valve 7 remains closed so that the water is thus caused to pass from the heater "B" to the receptacle "C" through the pipe 28, connected to the pipe "D" by the pipe "J". In this action the check valve 29 of pipe 28 closes to cut off the admission of the water to the bottom of the tank "C" and the water therefore passes by an open check-valve 29′ upward through a pipe 4 into the top of the tank "C".

Air in the tank "C", as previously explained, has been emptied out and as the water enters the tank "C" there will be a slight reduction in its temperature due to radiation of the heat from the pipes or pipe connections. This reduction in temperature and temperature pressure is slight. While said reduction in temperature and temperature pressure is slight it would be sufficient to cause the water to pass from the heater "B" to the tank "C". Again, however, for commercial purposes I prefer to use means to expedite the movement of the water from the heater "B", and the same would be true as to the heater "A", to the tank "C". For this purpose I increase the velocity of the movement of the water from the heater "B" to the tank "C" by supplying compressed air to the heater "B" from the low-pressure line G through the pipe 37, previously described, by simply opening the valve 130 controlling such admission. In this way the pressure is raised in the heater "B" to accomplish the desired result.

Suitable water gauges 39′ and 39 enable the operator to observe when the water is emptied from the heaters "A" and "B," respectively.

As soon as the water has been emptied from the heater "B" the valve 8 is closed and the valve 40, in a pipe "K" leading to the heater "B," may be opened so as to permit any steam or air remaining in the heater "B" to pass off into the atmosphere.

If any water has been used for cooling the cured rubber articles in the heater "B," such water may be readily emptied out of the heater through a pipe 31 by simply opening a valve 41.

The cured rubber articles may now be removed from the heater "B," the curing medium of which has either been stored in the tank "C," or caused to pass back to the heater "A." Should the water be in the storage tank "C" it may be caused to flow into the heater "B" by opening the valve 8, associated with said heater, and also opening the valve 27. Valve 7 remains closed. The water from the tank "C" is under the pressure of its own temperature and will, therefore, pass by the check-valve 29 in the pipe 28', through the pipe 28 (check-valve 29' being closed) through the valve 8, close the check valve 11 and pass up into the top of the heater "B" through the pipe "E." The water is then sprayed on to the tubes assumed to have been installed in the heater "B" by means of the pipe "F." Again the valve 14 is opened to permit air in the heater "B" to escape under a fixed pressure control means consisting of the poppet valve 13, in the manner previously set forth, using the discharge pipe 17, previously referred to.

The temperature and temperature pressure in the tank "C" has fallen slightly owing to the transferring of the water thereto and back now to the heater "B," and is further reduced by the water contacting with the load of cold gum-stock, and poles, in the heater "B." Steam is applied to the top of the water in the tank "C" through the pipe 3 by opening the valve X and this steam not only acts as a motive medium to assist in propelling from the tank "C" to the heater "B," but at that same time it is utilized as a convenient means for heating the water to slightly raise its temperature as required or desired for its use in the heater "B." This steam applied to the top of the water in the tank "C" does not tend to heat the water a great deal owing to the mode of its application and the fact that the water is not circulating. Therefore the water absorbs the heat of the steam primarily by radiation and this accounts for the only slight increase in temperature. When the heater "B" is filled the valves 8 and X are closed.

Instead of using steam to move the water from the tank "C" to the heater "B" I could use compressed air but I prefer the steam owing to the heating action set forth. Moreover, the steam remaining in the storage receptacle will be condensed into water upon the return of the water from the heater B, and by its condensation will raise the temperature of the water in a desirable manner.

The check valve 29 prevents the water withdrawn from the heater from passing into the tank "C" at the bottom, the pipe 4 forming the inlet pipe at the top of the tank and thereby preventing an objectionable water hammer effect.

In order to cool the rubber articles cured in either of the heaters I employ a cold water pipe 42 having branches 43 and 43' leading to the pipes "E" and E', respectively. Controlling valves 44 and 44' are mounted on the pipes 43 and 43', respectively. If a load of the vulcanized rubber articles in the heater "A" is to be cooled before exposing the same to atmospheric pressure, the valve 44' is opened and water from the pipe 43' will be caused to enter the heater by means of the pipes E' and F'.

This water used for cooling may be drained out of the heater "A" by opening the valve 41', by which action the water may be emptied into a storage tank O through the drain-pipe 31 previously referred to.

I provide a suitable pump "L" as a desirable accessory, supplied with water by a priming pipe 45 which is connected with the pipe 42. When emptying both of the heaters "A" and "B" at the same time, the storage tank "C" will be connected to receive the water from one heater and the water from the other heater will be emptied into the storage tank "K."

In order to force the water from the tank O back to the heater "A" the valves in all of the largest pipe lines are closed excepting valves 7 and 47. The water will then be forced from the tank O up through the pipe 46 leading from the pump "L," through the valve 7, closing the check valve 10, up through the pipe E' into the top of the heater "A" through the perforated pipe F'.

To drain this heater "A" the valve 41' is opened and the water will drain to the tank O through the pipe 31.

To pump the water in the tank O to the heater "B" all of the valves in the large pipes except valve 47 and the valve 8 are closed. The water will then close the check valve 11 and go up into the top of the heater "B" through the pipe "E" and pipe "F".

To drain the water from the heater "B" the valve 41 is opened and the water passes through the pipe 31 back to the tank O.

To pump the water from the storage tank O to the storage and heating tank "C" valves 47 and 27 are opened and the water will pass through the pipes 28 and 4 to the tank "C". The tank "C" is drained from the bottom through the pipes 28' and 28 and the other connections through which it is supplied with water from the tank O.

By way of recapitulation, it may be stated that rubber tubes are generally vulcanized in vulcanizers or heaters at a temperature of about 300° F., at about 50 pounds temperature pressure. Obviously, if the rubber is vulcanized in water and the water is exposed to the atmosphere after it has been used for curing the rubber articles, the steam will escape out of the water, reducing the temperature down to approximately 210°, a loss of heat which must be built up again in order that the water may be used the next time for curing purposes. Necessarily this loss of heat represents wastage for to raise the heat of the water again to curing temperature and temperature pressure involves an expenditure of power in fuel, or otherwise, which represents a great deal of money.

My process and apparatus does away with nearly all of the above wastage of heat and therefore under commercial conditions I am enabled to operate my vulcanizers in my apparatus in a way representing a very considerable economy of expense. The principle which I avail of is the maintenance of the water at substantially its high temperature and with substantially its temperature pressure, of curing, while moving it from one vulcanizer to another either directly or indirectly, as through the intermediary of an interposed storage receptacle. Even when I empty both of my heaters I am still enabled by my apparatus to preserve nearly all of the heat units of the water charge of one heater, although the other heater must be emptied into the tank O where the water will reduce to atmospheric pressure or temperature, at least. Of course, if desired, the capacity of the storage tank could be made equal to the combined capacities of the two heaters, or even greater, or a separate storage tank of any suitable capacity could be provided for each heater.

I provide the storage tank O with a vent 49 leading to the atmosphere.

It is to be understood that instead of spraying the tubes with cold water as by the use of the water flowing through the pipe 42, I may pass through this pipe or other suitable inlet pipes warm water heated to approximately a temperature of 210° F. or 212° F. This water if pumped on to the tubes and poles in a heater will cool them down to approximately 212° F., and will prevent the tubes from expanding or "ballooning" away from the poles when exposed to the atmosphere but will leave them warm enough to be easily stripped from mandrel. Such cooling of the tubes by means of warm water may be effected by operating the pump L, which will force the warm water from the tank O up through the pipe 46 into either of the heaters A or B by means of the spray-pipes F or F', as the case may be. The water in the tank O is kept in its warm condition by the water condensation drained into it from either of the two heaters through the pipe 17 before referred to, as well as from the heater jacket through the discharge-pipe P indicated in Fig. 2.

I am giving the temperature figures above as approximate rather than exact because the cooling fluid used should be warm enough so that the tubes will not "balloon" and this applies whether the water used is employed after use in a heater or vulcanizer, or taken from an entirely different source.

The principle involved in this cooling is to bring the pole or mandrel on which the tube is mounted down to a fixed temperature, approximately 210° F. or atmospheric pressure, just sufficiently to prevent the ballooning action. The tube and pole are thus cooled practically uniformly down to said point eliminating the "ballooning".

If tube is cooled below 200°, hot gas between the mandrel and tube which causes the tube to "balloon" when hot, has been destroyed and will cause a vacuum, which will make the tube cling to the pole and make it very difficult to strip same off. Cooling with water at about 210° has the desired effect; it stops the tube from "ballooning" but does not destroy the film of gas between the mandrel and tube.

When the water is caused to enter a heater at the top it strikes the top of the heater and its force is broken; also it is thus caused to be sprayed down over the load of stock. Were the apertures in the pipe "F" pointed downwards the force of the water entering therethrough would strike and destroy the stock while in its raw state.

It is notable that the poles or mandrels 60 used on the heaters "A" and "B" are open at both ends, and are placed in the heaters at a slight angle to the horizontal so one end is higher than the other. This will greatly facilitate the circulation of the water freely through the poles accelerating the curing of the stock, and the uniformity of the curing action.

It is to be understood that so far as effective use of my apparatus is concerned, when the water is removed in preheated condition from one of the vulcanizing heaters "A" or "B", to the other, the heater which receives the water necessarily acts as a storage receptacle for the preheated liquid while said liquid is removed from the heater from which it is taken. To this extent, of course, each heater from the viewpoint of practical utility will perform the function of storing the preheated water for its associated heater just like the storage receptacle "C" does its work. It is true that when the water is conducted from one heater to the other, in its preheated condition, it is used in the second heater for vulcanizing purposes, which is a function of the second heater that cannot be performed by the storage receptacle "C". Furthermore, as previously set forth, I utilize steam under pressure as the motive medium for returning the water, still preheated, from the storage tank or receptacle "C" back to either vulcanizing heater, the steam acting, as also previously pointed out, as a heating medium to slightly raise the temperature of the water as it is so conducted.

The operation of moving the water from one heater at the bottom and conducting it into a second heater at the top has been presented. It is notable that this action is important and involves a novel method, because, by introducing the water from one heater into a second heater at substantially the curing temperature and corresponding pressure, it is obvious that the water will immediately start curing the rubber articles in the heater. Of course, the same holds true when the water is transferred from the storage receptacle into either of the heaters. Under these conditions, if I introduced the water at the bottom of the heater as the heater gradually fills, the articles nearer the bottom would be subjected to a longer vulcanizing or curing period than those at the top. On the other hand, I obtain the advantageous action of introducing the water nearly at the curing temperature and corresponding pressure into a second heater by spraying the water down on the articles so that the curing action takes place simultaneously on all of the articles and a uniform curing of them all results. In transferring the water from one heater to another, or from the storage tank to either heater, the rate of flow of water is susceptible of variation at will, dependent upon the difference in pressures within the receptacles or the setting of the valves in the water connections.

The word spray or spraying employed in the specification and claims is used in a broad and general sense, and is not intended to refer to any particular type of spray or to any particular mode of producing a spray, unless otherwise indicated, it being remembered that the general idea is to distribute the water onto all of the tubes simultaneously or substantially so to insure the uniform heating of the tubes, and to keep them covered with water during the submerging operation in order to prevent oxidation.

It will be understood that the apparatus and process above described do not depend in any way upon the use of any given number of relief-valves or the setting of the valves to blow off at any particular pressure. For example, the poppet-valve 13, referred to as a 45-pound relief-valve, is useful mainly in cases where the transfer of water is effected by the differential of temperature pressures within the different receptacles, as before explained. Obviously, when the water transfer is effected by the use of compressed air or steam, or some other motive force, the relief-valve may be set to blow off at any desired pressure below that of the propelling medium. As a matter of fact, if the pressure of the propelling medium were great enough, the relief-valve could be set to blow off at the maximum pressure which it is desired to create in the vulcanizing chamber being filled with water, such maximum pressure being given herein as 150 pounds by way of example.

Having thus described my invention, what I claim as new and desire to secure by Letters Patent, is:

1. The method of curing rubber articles which consists in placing the articles in a closed chamber, introducing water heated to vulcanizing temperature into said chamber by causing it to be sprayed down upon said rubber articles, and heating the water to curing temperature.

2. The method of vulcanizing rubber articles, which consists in placing the articles to be vulcanized in a suitable closed receptacle, admitting into said receptacle water or an equivalent liquid while heated to a vulcanizing temperature, and distributing said water onto all of the articles simultaneously or substantially so to insure the uniform heating of the articles.

3. In vulcanizing apparatus, in combination, a heater adapted to hold the articles to be cured, and means for introducing water into the heater under high pressure, comprising a pipe having openings to cause the water to impinge against a wall of the heater and become sprayed above the articles to be cured so as to fall down thereon.

4. An improvement in the method of vulcanizing rubber articles in water or an equivalent liquid, which consists in carrying out a vulcanizing operation in a suitable receptacle, transferring the water after vulcanization to a suitable storage receptacle, later transferring the water to the same or a different vulcanizing receptacle for use in carrying out another vulcanizing operation, and maintaining the water substantially at vulcanizing temperature and temperature pressure during transfer.

5. An improvement in the method of vulcanizing rubber articles in water or an equivalent liquid, which consists in carrying out a vulcanizing operation in a suitable receptacle, transferring the water after vulcanization to a suitable storage receptacle, later transferring the water to the same or a different vulcanizing receptacle for carrying out another vulcanizing operation, and maintaining the water above the boiling point and at the corresponding temperature pressure during transfer.

6. An improvement in the method of vulcanizing rubber articles in water or an equivalent liquid, which consists in carrying out a vulcanizing operation in a suitable receptacle, withdrawing the water from said receptacle and re-using it while substantially at vulcanizing temperature and temperature pressure for carrying out another vulcanizing operation, and supplying sufficient heat to the water in the latter operation to compensate for the loss due to radiation and absorption.

7. An improvement in the method of vulcanizing rubber articles in water or an equivalent liquid, which consists in carrying out succeeding vulcanizing operations in different receptacles, and utilizing for a succeeding vulcanizing operation the heat contained in the water, while above the boiling point and at the corresponding temperature pressure, as used for a preceding vulcanizing operation, and supplying to the water used for the succeeding vulcanizing operation sufficient heat to bring it to the desired vulcanizing temperature.

8. An improvement in the method of vulcanizing rubber articles in water or an equivalent liquid, which consists in carrying out a vulcanizing operation in a suitable receptacle, transferring the water after vulcanization to a suitable storage receptacle, later transferring the water to the same or a different receptacle in the form of a spray for carrying out another vulcanizing operation, and maintaining the water above the boiling point and at the corresponding temperature pressure during transfer.

9. An improvement in the method of vulcanizing rubber articles in water or an equivalent liquid, which consists in carrying out a vulcanizing operation in a suitable receptacle, transferring the water after vulcanization to a suitable storage receptacle while maintaining it above the boiling point and at the corresponding temperature pressure and later transferring the water to the same or a different vulcanizing receptacle by the admission of steam at the top of the storage receptacle under sufficient pressure to expel the water from the bottom thereof and force it into the vulcanizing receptacle.

10. An improvement in the method of vulcanizing rubber articles in water or an equivalent liquid, which consists in transferring water, while maintained above the boiling point and at the corresponding temperature pressure from a storage receptacle into a vulcanizing receptacle under the motive force of steam pressure, allowing the steam to remain in the storage receptacle after the water transfer, and later forcing the water from a vulcanizing receptacle back into the storage receptacle under a pressure greater than the steam pressure, thereby condensing the steam and causing it to heat the water.

11. An improvement in the method of vulcanizing rubber articles, which consists in spraying water or an equivalent liquid while heated to a vulcanizing temperature onto the articles to be vulcanized.

12. An improvement in the method of vulcanizing rubber articles, which consists in placing the articles to be vulcanized in a suitable closed receptacle, and admitting into said receptacle water or an equivalent liquid while heated to a temperature above 212 degrees F. in the form of a spray which plays upon the articles.

13. The method of vulcanizing rubber articles, which consists in placing the articles to be vulcanized in a suitable closed receptacle, admitting into said receptacle water or an equivalent liquid while heated to a temperature above 212 degrees F. in the form of a spray which plays upon the articles, and then heating the water within the receptacle sufficiently to raise it to the final vulcanizing temperature.

14. An improvement in the method of vulcanizing rubber articles, which consists in spraying the articles to be vulcanized with and gradually submerging them in water or an equivalent liquid heated to a vulcanizing temperature.

15. An improvement in vulcanizing rubber articles, which consists in gradually submerging the rubber articles to be vulcanized in water or an equivalent liquid heated to a vulcanizing temperature and spraying said articles with water as the submerging operation proceeds.

16. The method of vulcanizing rubber articles, which consists in placing the articles to be vulcanized in a suitable closed receptacle, and gradually submerging the articles in water or an equivalent liquid heated to a temperature above 212 degrees F. and admitted into said receptacle in the form of a spray which plays upon the articles until they are submerged.

17. The method of vulcanizing rubber articles, which consists in placing the articles to be vulcanized in a suitable closed receptacle, gradually submerging the articles in water or an equivalent liquid heated to a vulcanizing temperature and admitted into said receptacle in the form of a spray which plays upon the articles until they are submerged, and heating the water as it gradually fills the receptacle sufficiently to raise it to the final vulcanizing temperature.

18. The method of vulcanizing rubber articles, which consists in placing the articles to be vulcanized in a suitable closed receptacle, gradually submerging the articles in water or an equivalent liquid heated to a vulcanizing temperature and admitted into said receptacle in the form of a spray which plays upon the articles until they are submerged, heating the water as it accumulates within the receptacle sufficiently to raise it to the final vulcanizing temperature, and causing a forced circulation of the body of water within the receptacle until it is heated to said temperature.

19. The method of vulcanizing rubber articles, which consists in placing the articles to be vulcanized in a suitable closed receptacle, gradually submerging the articles in water or an equivalent liquid heated to a vulcanizing temperature and admitted into said receptacle in the form of a spray which plays upon the articles until they are submerged, and causing a forced circulation of the water within the receptacle during the initial stage of vulcanization.

20. An improvement in the method of vulcanizing rubber articles, which consists in spraying water or an equivalent liquid while heated to a vulcanizing temperature onto the articles to be vulcanized, and subjecting the articles during the setting period to a pressure substantially in excess of the vulcanizing temperature pressure.

21. An improvement in the method of vulcanizing rubber articles in water or an equivalent liquid, which consists in admitting the water while heated to a vulcanizing temperature into a suitable closed receptacle containing the articles to be vulcanized, and causing a forced circulation of the water within the receptacle without withdrawing the water therefrom during the initial stage of vulcanization.

22. The method of vulcanizing rubber articles, which consists in placing the articles to be vulcanized in a suitable receptacle, admitting into said receptacle water or an equivalent liquid while heated to a vulcanizing temperature to cover the articles, and then heating the water within the receptacle to the desired vulcanizing temperature by the injection of a heating medium which simultaneously produces a forced circulation of the water.

23. The method of vulcanizing rubber articles, which consists in placing the articles to be vulcanized in a suitable receptacle, admitting into said receptacle water or an equivalent liquid while heated to a vulcanizing temperature to submerge the articles, heating the water within the receptacle sufficiently to raise it to the desired vulcanizing temperature and causing a forced circulation thereof as the submerging operation proceeds, and during the setting period maintaining the water under pressure substantially in excess of the vulcanizing temperature pressure.

24. The method of vulcanizing rubber articles in water or an equivalent liquid, which consists in placing the articles to be vulcanized in a suitable receptacle, admitting water while heated to a vulcanizing temperature into said receptacle so as gradually to submerge the articles, and causing the water as it rises within the receptacle to build up therein a gradually increasing pressure above the prevailing temperature pressure, until a predetermined point is reached.

25. The method of vulcanizing rubber articles in water or an equivalent liquid, which consists in placing the articles to be vulcanized in a suitable receptacle, admitting water while heated to a vulcanizing temperature into said receptacle so as gradually to submerge the articles, and causing the water as it rises within the receptacle to build up therein a gradually increasing pressure above the prevailing temperature pressure, until the articles are submerged, and at or about that time subjecting the water to a still greater pressure.

26. The method of vulcanizing rubber articles, which consists in subjecting the articles to be vulcanized to contact with water or an equivalent liquid heated to a vulcanizing temperature, maintaining the articles under pressure in excess of the prevailing temperature pressure, and building up said excess pressure in stages whereby the articles may be subjected to different desired pressures above the temperature pressure at different stages of vulcanization.

27. The method of vulcanizing rubber articles which consists in placing the articles to be vulcanized in a suitable receptacle, admitting into said receptacle water or an equivalent liquid while heated to a vulcanizing temperature and under a pressure less than the final vulcanizing pressure, applying to the articles before they become set a pressure in excess of the temperature pressure, and maintaining said excess pressure until after the articles become set.

28. An improvement in the method of vulcanizing rubber articles in water or an equivalent liquid, which consists in carrying out a vulcanizing operation in a suitable receptacle, transferring the water after vulcanization to a suitable storage receptacle, later transferring the water to the same or a different vulcanizing receptacle at a rate susceptible of variation at will for use in carrying out another vulcanizing operation, and maintaining the water substantially at vulcanizing temperature and temperature pressure during transfer.

In testimony whereof I affix my signature.

LAURITS A. LAURSEN.